(12) United States Patent
Brisebois et al.

(10) Patent No.: US 9,282,380 B2
(45) Date of Patent: *Mar. 8, 2016

(54) METHOD AND APPARATUS FOR PROVIDING WIRELESS DIGITAL TELEVISION SERVICE

(71) Applicant: AT&T MOBILITY II LLC, Atlanta, GA (US)

(72) Inventors: Arthur Brisebois, Cumming, GA (US); Mark Causey, Tucker, GA (US); Adrianne Luu, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,371

(22) Filed: Sep. 4, 2015

(65) Prior Publication Data

US 2015/0382074 A1 Dec. 31, 2015

Related U.S. Application Data

(63) Continuation of application No. 14/607,592, filed on Jan. 28, 2015, now Pat. No. 9,154,850, which is a continuation of application No. 13/220,022, filed on Aug. 29, 2011, now Pat. No. 8,978,074.

(51) Int. Cl.

| | |
|---|---|
| *H04N 7/16* | (2011.01) |
| *H04N 21/647* | (2011.01) |
| *H04N 21/61* | (2011.01) |
| *H04N 21/222* | (2011.01) |
| *H04N 21/414* | (2011.01) |
| *H04L 29/06* | (2006.01) |
| *H04N 21/44* | (2011.01) |

(52) U.S. Cl.
CPC ...... *H04N 21/64776* (2013.01); *H04L 65/4076* (2013.01); *H04L 65/80* (2013.01); *H04N 21/222* (2013.01); *H04N 21/41422* (2013.01); *H04N 21/44004* (2013.01); *H04N 21/44008* (2013.01); *H04N 21/6131* (2013.01); *H04N 21/6181* (2013.01)

(58) Field of Classification Search
CPC .................. H04N 21/64776; H04N 21/6131; H04N 21/222; H04N 21/41422; H04N 21/6181; H04N 21/44008; H04N 21/44004; H04L 65/4076; H04L 65/80
See application file for complete search history.

(56) References Cited

U.S. PATENT DOCUMENTS

| | | | |
|---|---|---|---|
| 6,577,353 | B1 | 6/2003 | Welles |
| 6,763,229 | B2 | 7/2004 | Meehan |

(Continued)

OTHER PUBLICATIONS

Ibanez, "Mobile TV over 3G networks—Service and enablers evolution", Ericsson Review No. 1, 2008.

*Primary Examiner* — Oschta Montoya
(74) *Attorney, Agent, or Firm* — Guntin & Gust, PLC; Jay H. Anderson

(57) ABSTRACT

A system that incorporates teachings of the present disclosure may include, for example, a method for receiving one or more wireless digital television signals, wherein each of the one or more wireless digital television signals comprise a plurality of data segments for presenting media content, buffering the plurality of data segments of each of the one or more wireless digital television signals to generate one or more buffered data segments to cause a presentation delay of the media content, and detecting a missing data segment in the one or more buffered data segments. The method can further include transmitting a first request to a cellular communication system to provide the missing data segment, and receiving from the cellular communication system the missing data segment prior to an expiration of the presentation delay to continue a presentation of the media content without interruption. Other embodiments are disclosed.

20 Claims, 7 Drawing Sheets

(56) References Cited

U.S. PATENT DOCUMENTS

| | | | | |
|---|---|---|---|---|
| 2005/0108759 A1* | 5/2005 | Arsenault | ........ | H04B 7/18513 725/72 |
| 2006/0253888 A1* | 11/2006 | Senga | ................ | H04W 24/00 725/123 |
| 2008/0253436 A1 | 10/2008 | Bellec | | |
| 2009/0178087 A1* | 7/2009 | Menn | ................ | H04L 1/1838 725/86 |
| 2010/0080305 A1* | 4/2010 | Guo | ................ | H04N 19/895 375/240.27 |

* cited by examiner

METHOD AND APPARATUS FOR PROVIDING WIRELESS DIGITAL TELEVISION SERVICE

CROSS-REFERENCE TO RELATED APPLICATION(S)

This application is a continuation of U.S. patent application Ser. No. 14/607,592, filed Jan. 28, 2015, which is a continuation of U.S. patent application Ser. No. 13/220,022, filed Aug. 29, 2011 (now U.S. Pat. No. 8,978,074). All sections of the aforementioned application is incorporated herein by reference in its entirety.

FIELD OF THE DISCLOSURE

The present disclosure relates generally to a method and apparatus for providing wireless digital television service.

BACKGROUND

The signal quality of wireless broadcast of digital television signals can degrade in vehicular or other non-stationary applications due to fading, multipath and travel between broadcast stations. As is the case with most broadcast technologies, a wireless broadcast of digital television has no feedback mechanism or means to replace video packets or frames lost at the receiving end. Past attempts to solve this problem have proven expensive and non-sustainable.

Third generation Smartphones and other connected devices may receive unicast streamed content on-demand. This content is relatively reliable, as it is sent by cellular radio networks which enable retransmission, error correction and handover is mobile applications. On the other hand, a digital television stream may occupy a significant portion of the cell site capacity, and is therefore delivered at an unsustainable cost. The required bandwidth may also lead to congestion situations in venues where multiple users demand (but are unable to receive) the same content.

A standard promulgated by the Advanced Television Systems Committee for mobile and handheld devices, also referred to as mobile digital television, allows television broadcasters to send mobile-optimized content to handheld devices. This new technology requires specialized transmitters and receivers, which both bring additional costs. Lacking a means to provide feedback and receive commands from the network, it is questionable whether this protocol will be as reliable as streaming content received over dedicated cellular connections.

DETAILED DESCRIPTION

Figure 1:
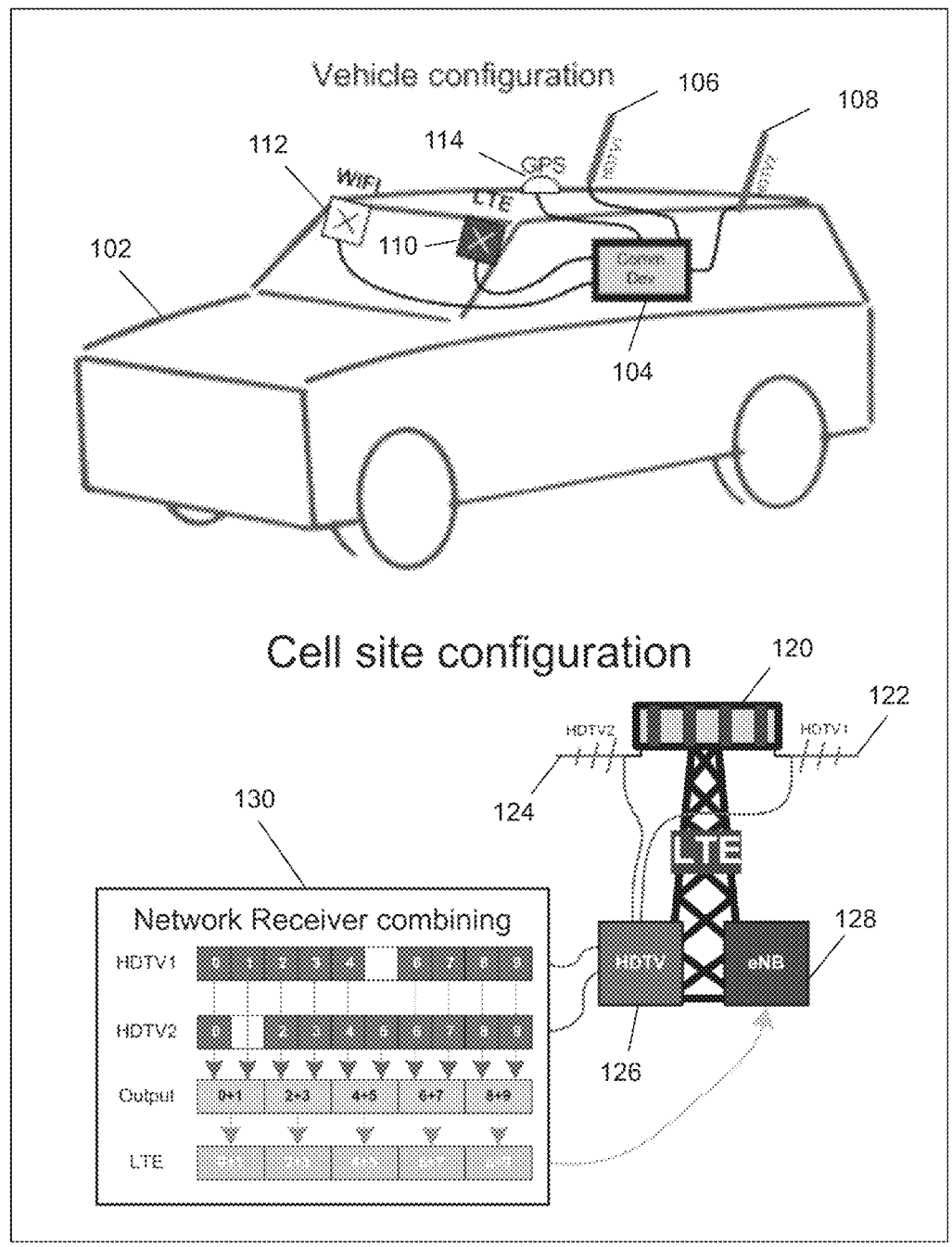
FIGS. 1-2 depict illustrative embodiments of communication systems for providing media services.

The present disclosure describes, among other things, illustrative embodiments of a system for mitigating communication interruptions experienced by user equipment receiving signals from wireless digital television broadcasters.

One embodiment of the present disclosure includes a device comprising a first mobile television receiver, a second mobile television receiver, a cellular transceiver, a memory, and a processor coupled to the first and second mobile television receivers, the cellular transceiver, and the memory. The processor can be operable to receive from the first mobile television receiver a first wireless digital television signal comprising a first plurality of data segments for presenting a television program, receive from the second mobile television receiver a second wireless digital television signal comprising a second plurality of data segments for presenting a copy of the television program, and buffer via the memory the first and the second plurality of data segments to generate a first and a second buffered plurality of data segments to cause a presentation delay of the television program. The processor can be further operable to periodically select data segments from one of the first or the second buffered plurality of data segments, and present the television program according to the periodically selected data segments. Upon detecting a missing data segment in the first and the second buffered plurality of data segments, the processor can also be operable to transmit via the cellular transceiver a request to a network element to provide the missing data segment, and receive via the cellular transceiver the missing data segment prior to an expiration of the presentation delay to continue the presentation of the television program without interruption.

One embodiment of the present disclosure includes a wireless base station, comprising a first television receiver, a second television receiver, cellular transceiver, a memory, and a processor coupled to the first and second television receivers, the cellular transceiver, and the memory. The processor can be operable to receive from the first television receiver a first wireless digital television signal comprising a first plurality of data segments for presenting a media program, receive from the second television receiver a second wireless digital television signal comprising a second plurality of data segments for presenting a copy of the media program, and buffer via the memory the first and the second plurality of data segments to generate first and second buffered plurality of data segments to cause a delay of the media program. The processor can be further operable to receive a request from a mobile device for a missing data segment, detect a copy of the missing data segment in at least one of the first or the second buffered plurality of data segments, and transmit the copy of the missing data segment to the mobile device prior to an expiration of the delay to continue a presentation of the media program at the mobile device without interruption.

One embodiment of the present disclosure includes a method for receiving one or more wireless digital television signals, wherein each of the one or more wireless digital television signals comprise a plurality of data segments for presenting media content, buffering the plurality of data segments of each of the one or more wireless digital television signals to generate one or more buffered data segments to cause a presentation delay of the media content, and detecting a missing data segment in the one or more buffered data segments. The method can further include transmitting a first request to a cellular communication system to provide the missing data segment, and receiving from the cellular communication system the missing data segment prior to an expiration of the presentation delay to continue a presentation of the media content without interruption.

Figure 2:
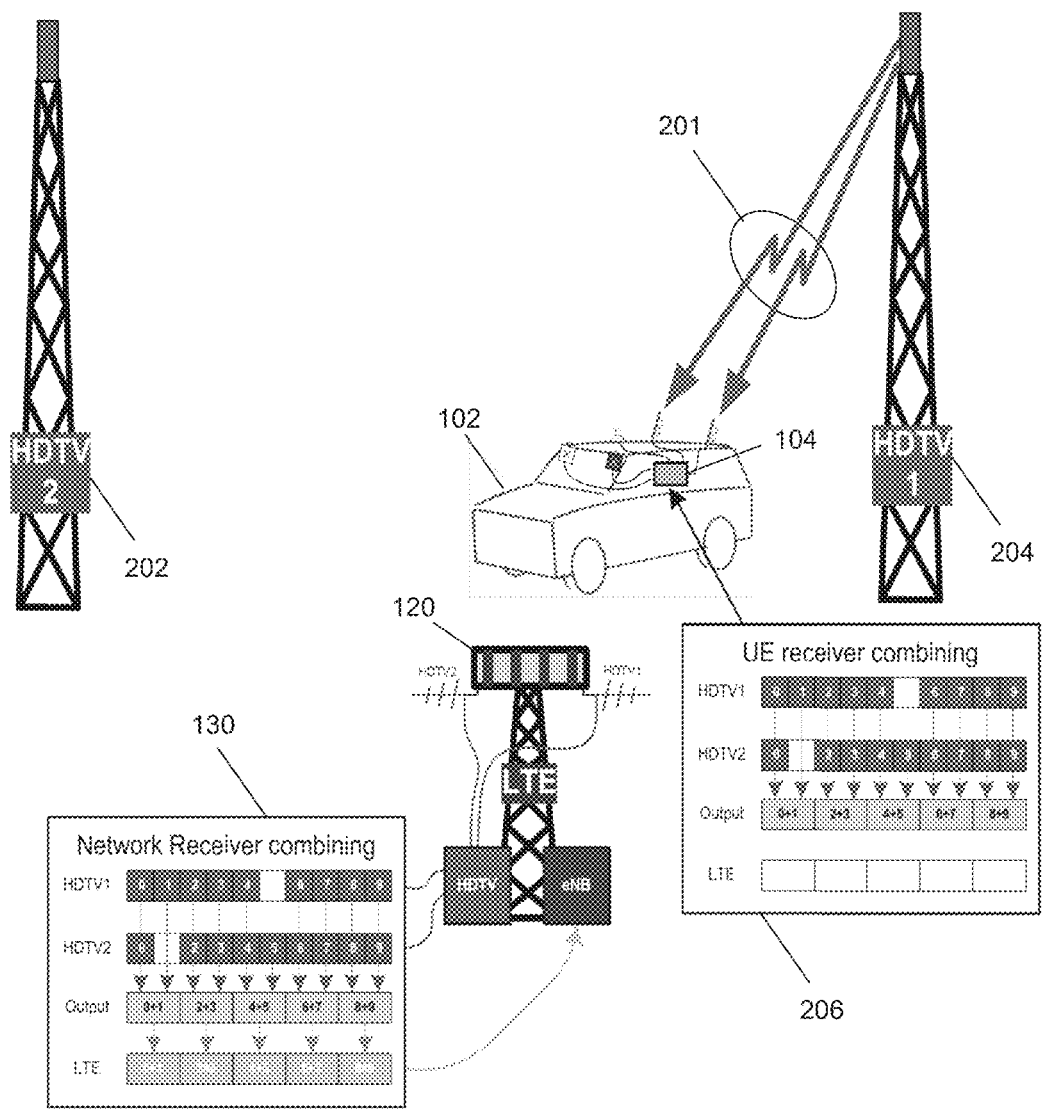

FIGS. 1-2 depict communication systems in which a vehicular system can communicate with digital television broadcast stations and a cellular communication system. FIG.

1 depicts a vehicle 102 comprising a communication device 104 coupled to two digital television antennas 106, 108. Although the antennas 106, 108 are labeled as high definition digital television antennas, the antennas 106, 108 can receive digital broadcast content such as standard definition television content, high definition television content, and/or digital audio content such as digital radio. The antennas 106, 108 receive wireless digital broadcast signals from broadcast stations 202, 204 such as shown in FIG. 2.

The communication device 104 can comprise demodulation and signal processing technology which can take advantage of diversity technology principles by receiving identical content from each antenna 106, 108 to improve reception. The communication device 104 can comprise processing technology such as a microprocessor, a digital signal processor (DSP), and/or a video processor with associated storage memory such as Flash, ROM, RAM, SRAM, DRAM or other storage technologies.

The communication device 104 can further comprise a display (not shown) such as a monochrome or color LCD (Liquid Crystal Display), OLED (Organic Light Emitting Diode) or other suitable display technology for conveying images to an end user of the communication device 104. The communication device 104 can provide an input interface by way of the display if the display supports touch-screen technology. In another embodiment, the communication device 104 can be coupled to a key pad for manual control and navigation of a graphical user interface. The communication device 104 can also comprise an audio system (not shown) to enable a user to listen to audio content supplied by the broadcast stations 202, 204.

In one embodiment, the communication device 104 can be coupled to a cellular communication device 110 that supports third generation (e.g., Universal Mobile Telecommunications or UMTS), fourth generation (e.g., Long Term Evolution or LTE), or other future cellular communication protocols. In the present illustration, the cellular communication device 110 operates according to an LTE communication protocol. The communication device 104 can cause the cellular communication device 110 to exchange messages with a cellular base station 120 such as shown in FIG. 1.

In one embodiment, the communication device 104 can be coupled to a short range communication device 112 for engaging in short range communications with access points operating according to communication protocols such as WiFi (also known as Wireless Fidelity), Bluetooth, Zigbee, or other short range communication protocols. The communication device 104 can cause the short range communication device 112 to exchange messages with a network element such as a server operating in a communication system.

In one embodiment, the communication device 104 can be coupled to a location receiver 114 (such as a global position system or GPS receiver). The location receiver 114 can provide the communication device 104 coordinate information to locate the position of the vehicle 102 as well as trajectory information indicative of the orientation and direction of travel of the vehicle 102, speed, and other relevant factors which can be used to estimate an arrival time at one or more destinations.

The cellular base station 120 can comprise an eNodeB compliant controller 128 for supporting LTE communications with mobile devices such as the cellular communication device 110. The cellular base station 120 can also be coupled to a digital television communication device 126 functionally similar to the communication device 104. The digital television communication device 126 can be coupled to two digital television antennas 122, 124 for diversity reception of communication signals transmitted by the digital television broadcast stations 202, 204 of FIG. 2.

The digital television communication device 126 can receive broadcast digital television signals by way of antennas 122, 124, which it can demodulate into baseband signals to produce data segments as depicted in table 130. The sequence of data segments can represent media content such as digital television program or digital radio program. When the digital television communication device 126 is unable to receive a data segment (indicated by "blank" slots) from one of the antennas 122 or 124, the digital television communication device 126 resorts to using the data segment received by the other antenna.

For example, in the illustration of FIG. 1 the digital television communication device 126 is unable to receive data segment 1 from antenna 124—see table 130. In this instance, the digital television communication device 126 can resort to using data segment 1 received from antenna 122. In the same illustration, the digital television communication device 126 is unable to receive data segment 5 from antenna 122. For this case, the digital television communication device 126 can resort to using data segment 5 received from antenna 124. Diversity reception techniques improves the ability of the digital television communication device 126 to receive broadcast signals transmitted by broadcast stations 202, 204 (FIG. 2) that do not support retransmission requests. The aforementioned approach for recovery of data segments is also used by the communication device 104 as depicted by table 206 of FIG. 2.

It should be noted that since the cellular base station 120 is a terrestrial stationary base station, the antennas 122 and 124 can be configured to optimize reception of signals transmitted by the digital television broadcast stations 202 and 204—which are themselves also terrestrial stationary stations. Consequently, the cellular base station 120 has a much higher likelihood of receiving high quality reception of broadcast signals than the communication device 104 would while the vehicle 102 is in transit.

FIG. 2 illustrates circumstances where the communication device 104 of vehicle 102 can receive digital television signals 201 from broadcast station 204 with the ability to recover from lost data segments without assistance from other sources. When the communication device 104 is unable to receive data segments from both antennas 106, 108, and the data segments are co-aligned (e.g., cannot receive data segment 5 from either antenna), the communication device 104 will be unable to recover the lost segments, and a presentation fault may occur, which may be perceptible to the user visually and/or audibly.

Figure 3:
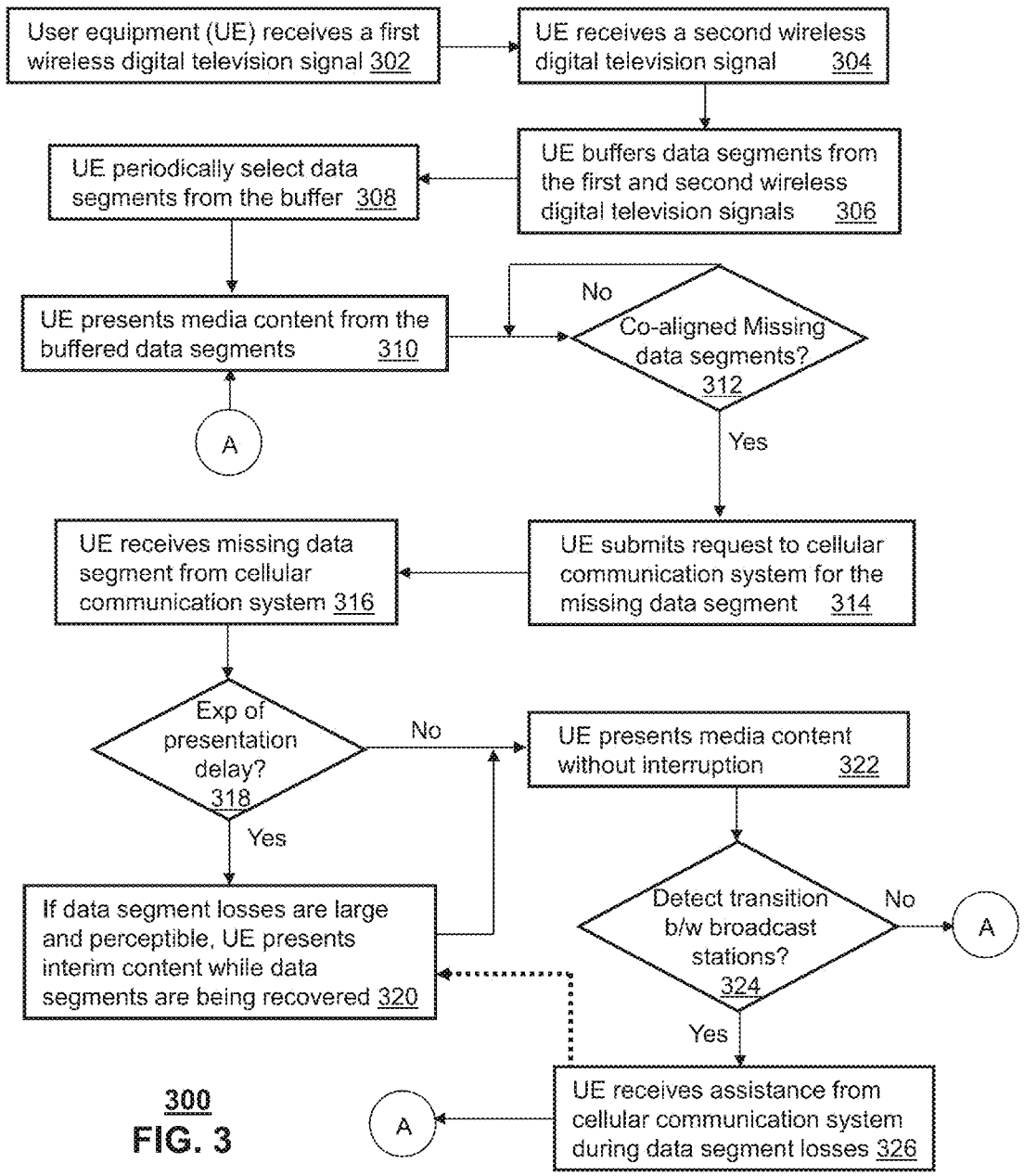
FIG. 3 depicts an illustrative embodiment of a method applied to the communication systems described in FIGS. 1-2.
Figure 4:
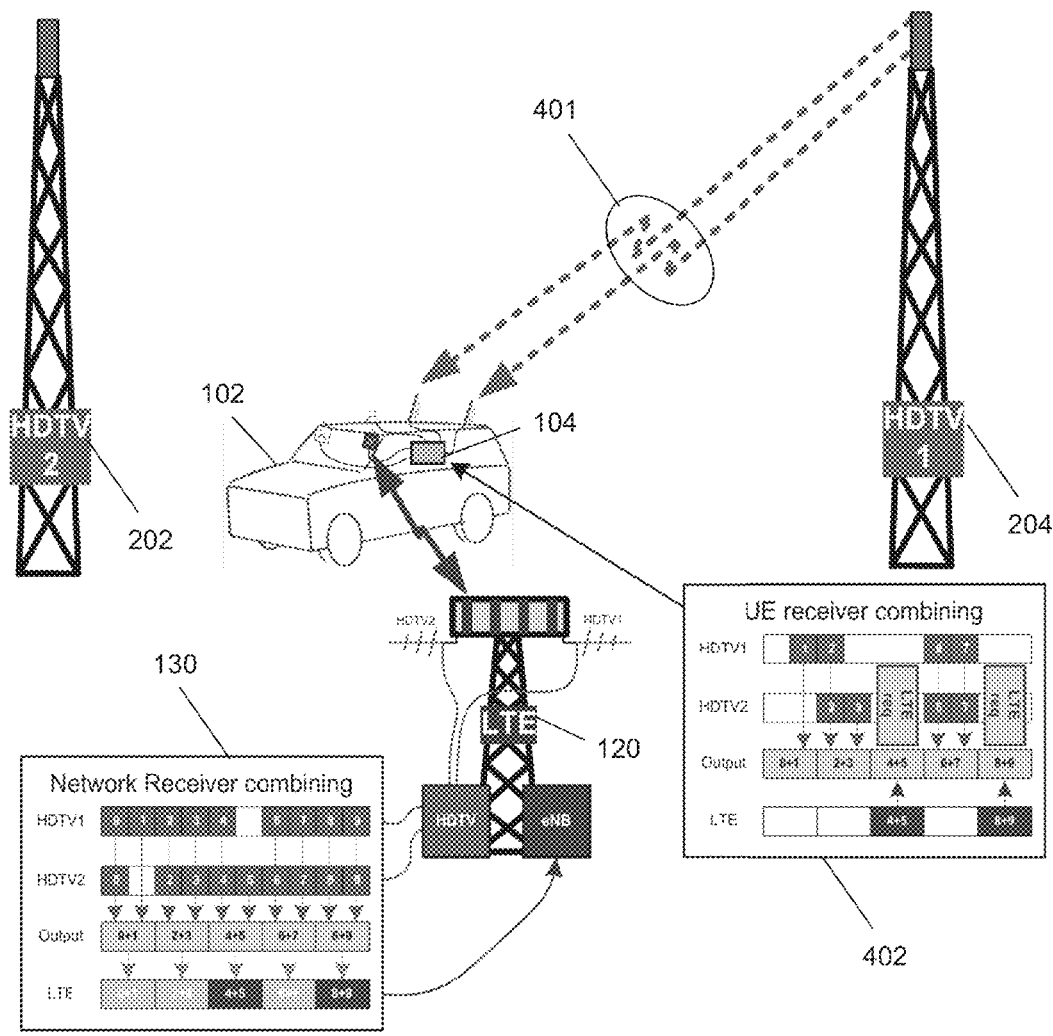
FIGS. 4-6 depict illustrative embodiments of the communication systems of FIGS. 1-3 when operating according to the method of FIG. 3.

FIG. 3 depicts an illustrative of a method 300 that can resolve such faults and can provide mobile communication devices such as communication device 104 a means for reliable communications. Method 300 can begin with steps 302 and 304 in which user equipment such as the communication device 104 of vehicle 102 receives wireless digital television signals 401 as depicted in FIG. 4 from broadcast station 204. For illustration purposes, the user equipment referred to in the flowchart of FIG. 3 will be referred to herein as communication device 104. It is further noted that in the present illustration, the vehicle 102 is assumed to be in transit. Thus, the communication device 104 can experience multipath fading (e.g., Rayleigh fading) or other forms of signal degradation.

To mitigate losses of co-aligned data segments, the communication device 104 can be configured in step 306 to buffer the data segments extracted from each antenna signal with the memory component of the communication device 104. The buffered data segments can be used to cause a presentation delay of media content represented by the data segments. Media content in the present context can represent still image content, moving image content, audio content, or combinations thereof. The communication device 104 can be configured to cause a presentation delay (e.g., 5-10 seconds) sufficient to allow the communication device 104 to perform mitigation of data segment losses. In step 308, the communication device 104 can periodically select data segments from either of the buffered data segment streams for presenting media content by way of a presentation interface (display/ audio components) of the communication device 104 as described earlier.

In step 312, the communication device 104 can be configured to detect co-aligned data segments losses due to a degraded signal received by both antennas 106, 108, which the communication device 104 is unable to correct by error correction or other mitigation techniques. In the illustration of FIG. 4, the communication device 104 is unable to receive co-aligned data segments 0, 4, 5, 8 and 9 as depicted in table 402 for reasons such as poor signal integrity from either antenna 106, 108 causing an excessively high bit error rate that cannot be corrected with error correction techniques. Since a broadcast transmission is unidirectional, and retransmissions cannot be requested from the broadcast stations 202, 204, the communication device 104 proceeds to step 314 where it submits a request to a cellular communication system for the missing data segments. In the present illustration, the cellular communication system is an LTE base station 120 of FIG. 4, which is assumed to represent one of several base stations 120 accessible to the communication device 104 as the vehicle travels between base station 120 cell sites.

As was noted earlier, the base station 120 of FIG. 4 is stationary and the digital television antennas 122, 124 shown in FIG. 1 can be optimally aligned to maintain consistent reception with the broadcast stations 202, 204. Accordingly, the base station 120 is not susceptible to the signal degradation experienced by the communication device 104 due the transit nature of the vehicle 102. There is therefore a high likelihood that the base station 120 can assist the communication device 104 in recovering any data segment losses experienced by the communication device 104. Upon receiving in step 314 the request submitted by the communication device 104, which can include identifying information of the missing data segments (e.g., header information), the base station 120 can retrieve a copy of the missing data segment from its own buffers, and transmit the missing data segment to the communication device 104 in step 316.

Since the base station 120 and the communication device 104 have both buffered the data segments, it is likely that the communication device 104 will be able communicate the base station 120 in time to receive the data segment before the expiration of the presentation delay discussed in step 306. If the communication device 104 detects that the presentation delay has not expired in step 318, the communication device 104 proceeds to step 322 where it inserts the received missing data segment in the data stream and presents the media content (e.g., television program, radio program, etc.) without interruption.

If, on the other hand, the data segment is received by the communication device 104 after the expiration of the presentation delay, the communication device 104 can then proceed to step 320 and present interim content (e.g., advertisement content, or pausing a frame of the media content presentation with music in the background, etc.), while data segments are being recovered. Once the data segments have been recovered, the communication device 104 can resume presentation of the media content in step 322.

Steps 318 and 320 can arise in situations where the communication device 104 experiences a large volume of data segment losses due to a burst error, or other interference factors that can cause an excessive loss of data segments. The base station 120 can be equipped with substantially more memory than the communication device 104. Accordingly, the base station 120 can buffer substantially more data segments than the communication device 104 is able to. Under such conditions, the base station 120 can provide a recovery mechanism that exceeds the buffer capacity of the communication device.

It should be noted that the base station 120 can also record an entire program (much like a digital video record). In this embodiment, if the user initiates a presentation of a media program after a start time of the broadcast, the user can submit a request to the communication device 104 to request a unicast retransmission of the missing portion. The communication device 104 can be configured with a non-volatile memory such as a hard drive or Flash memory to record the live broadcast while presenting the missing portion received from the base station 120.

Figure 5:
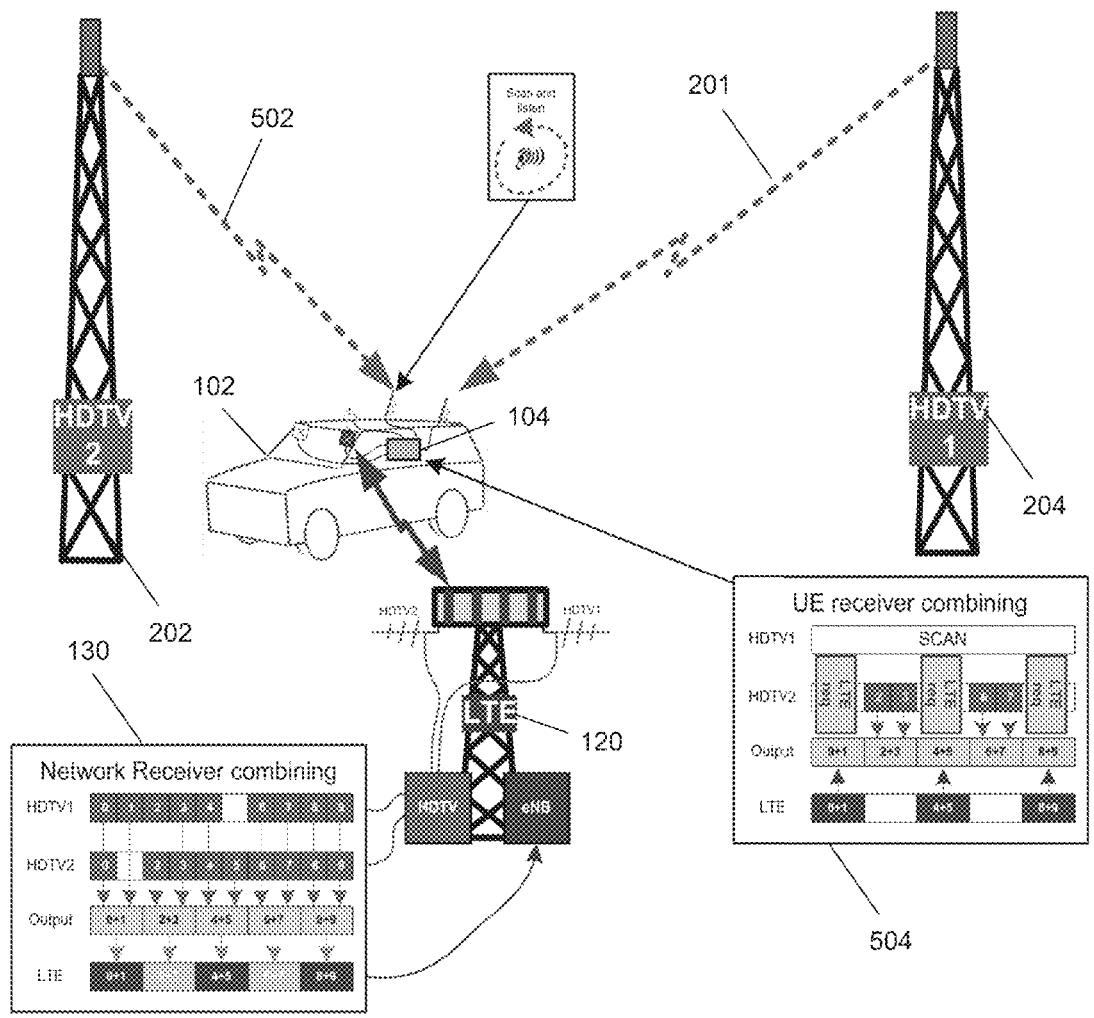

Referring now to step 324, the communication device 104 can also be configured to detect a transition between broadcast stations. This situation is depicted in FIG. 5. In the illustration, the vehicle 102 has transitioned to a location where the communication device 104 can sense signals from broadcast stations 202 and 204. In one embodiment, the communication device 104 can be configured to anticipate transitioning between broadcast stations by utilizing a look-up table stored in the memory of the communication device 104 that lists broadcast stations and their corresponding transmission frequencies and terrestrial locations. The communication device 104 can use this look-up table and compare it to its location (determined with the GPS receiver 114 of FIG. 1) to anticipate when it will be in communication range of another broadcast station. The list of broadcast stations can be transmitted to the communication device 104 responsive to the cellular base station 120 receiving a request from the communication device 104.

Alternatively, or in combination, the communication device 104 can determine its location and inform a base station 120 in its proximity of the location of the vehicle 102, and request updates to the look-up table so that the communication device 104 can be aware of broadcast stations that it is approaching as the vehicle 102 continues to change location. The communication device 104 can determine its location and trajectory and thereby anticipate a transition from broadcast station 204 to broadcast station 202 as depicted in FIG. 4. In another embodiment, the communication device 104 can detect that the diversity signals received from broadcast station 204 are fading thereby prompting the communication device 104 to submit a request to the base station 120 to identify the location of the next broadcast station (in this illustration broadcast station 202), and a base station 120 that serves the new broadcast station if the same base station 120 is unable to provide such services.

In one embodiment, it is possible that the program channels of broadcast station 202 are organized differently than the program channels of broadcast station 204. To continue a presentation of the same media content without interruption, the communication device 104 can request a program guide of the broadcast station 202 on or before it begins receiving digital television signals. With the program guide, the communication device 104 is able to selectively switch program channels at an opportune time when data segments from the new broadcast station 202 can be received reliably. By previously buffering the data segments of broadcast station 204, the communication device 104 is able to transition to another channel of broadcast station 202 for presenting the same content without interrupting the ongoing presentation. Thus to the user, the presentation continues while traveling without an understanding that the communication device 104 has transitioned to a new broadcast station.

During the transition from broadcast station 204 to broadcast station 202, however, the communication device 104 can be in the fringes of receiving reliable signals from the broadcast stations 202 and 204. This situation is depicted by table 504 as shown in FIG. 5. Under this condition, the communication device 104 can submit a request to the same cellular base station 120 serving broadcast station 204 if it is still in communication range, or the communication device 104 can submit the request to another base station 120 serving broadcast station 202. To selectively choose between base stations 120, a cross-reference can be added to the look-up table described earlier to identify which base stations 120 (identified by base station ID) support which broadcast stations. This information can be provided by any of the base stations 120 supplying a look-up table update.

Figure 6:
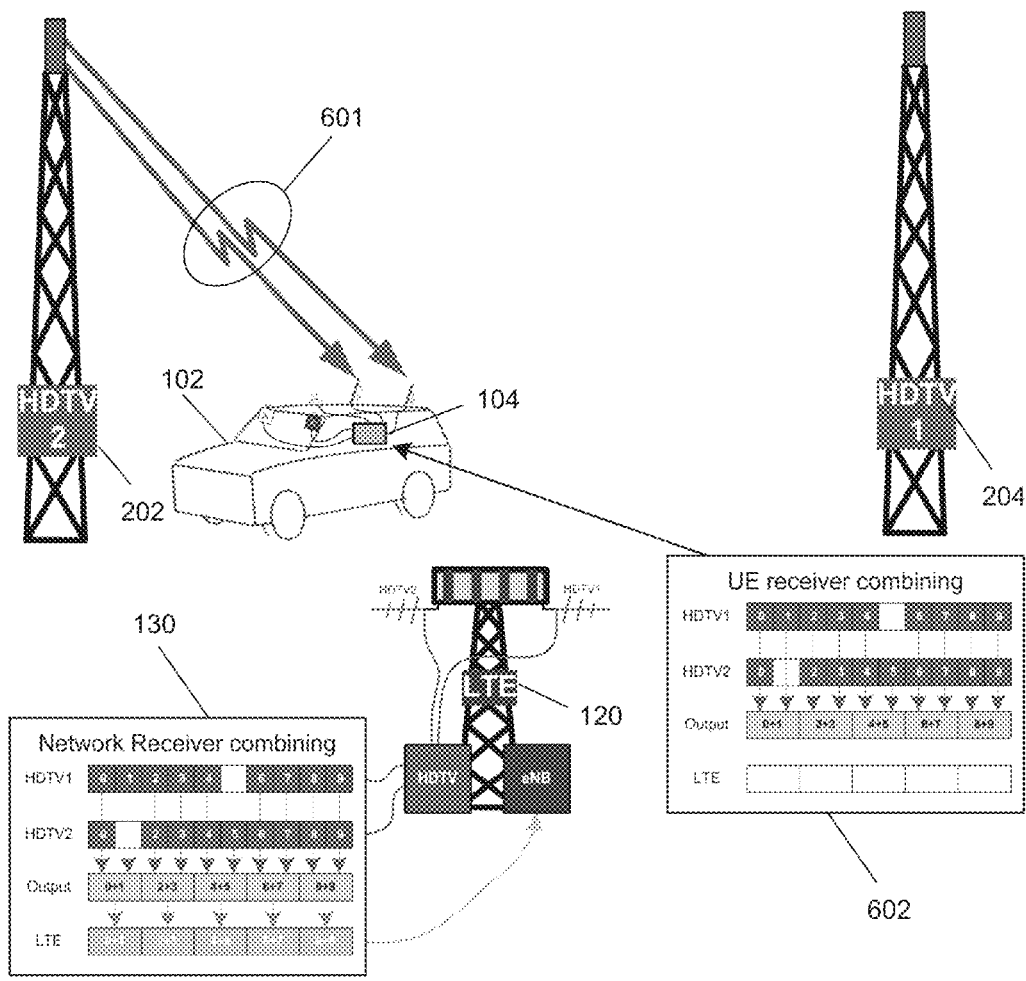

Once the communication device 104 identifies a base station 120, it can submit a request for the missing data segments while transitioning to the broadcast station 202. As described before, the base station 120 is stationary and its digital television antennas 122, 124 can be optimally aligned to reliably receive broadcast signals from broadcast station 202. Accordingly, it is very likely that the base station 120 will provide all the missing data segments requested by the communication device 104 during the transition without interrupting the presentation. If, however, the losses are severe and cannot be mitigated, then the communication device 104 can transition to step 320 and present interim content. The communication device 104 can continue to collect data segments from the base station 120 until such time that communications with the broadcast station 202 become reliable as shown in table 602 of FIG. 6. That is, when the communication device 104 detects that there are no longer co-aligned data segment losses, the communication device 104 can inform the base station 120 that reception is stable and transmission of data segments can cease.

Method 300 as just described provides mobile devices configured to receive digital television broadcast signals a means to substantially improve reception by mitigating anomalies such as multipath fading, and other possible interference factors.

Upon reviewing the aforementioned embodiments, it would be evident to an artisan with ordinary skill in the art that said embodiments can be modified, reduced, or enhanced without departing from the scope and spirit of the claims described below. For example, method 300 can be adapted so that when the vehicle 102 is in proximity of a WiFi access point, the communication device 104 can revert to requesting data segments by way of WiFi communications. The communication device 104 can for instance submit requests over the Internet to a network element that can provide backup support services as described above. The network element can be a communication device 126 shown in FIG. 1 located at a base station 120 in proximity to the broadcast station in use by the communication device 104. Alternatively, the network element can be a content server that stores copies of the media program and can retrieve any data segments identified by the communication device 104.

Method 300 can also be applied to handheld devices such as Smartphones capable of receiving digital television signals and/or digital radio, and enabled with cellular data communication resources (e.g., LTE, etc.) to replace lost segments as described above. Method 300 can also be applied to satellite receivers that can receive digital television signals and/or digital radio, and which are equipped with cellular data resources to replace portions of lost satellite broadcasts. The satellite receivers can be stationary devices such as set-top boxes which can be enhanced by back-up cellular resources (e.g., LTE via a femtocell) to protect against temporary data losses due to weather conditions. Method 300 can also be applied to high definition radio receivers enabled with cellular resources (e.g., LTE). A device can receive missing segments from a cellular base station that buffers data segments as they are broadcast. In another embodiment, the base station can request missing segments from a central data center (e.g., a network element server) and then transmit the data segments requested to the device. Other embodiments are contemplated by the present disclosure.

Figure 7:
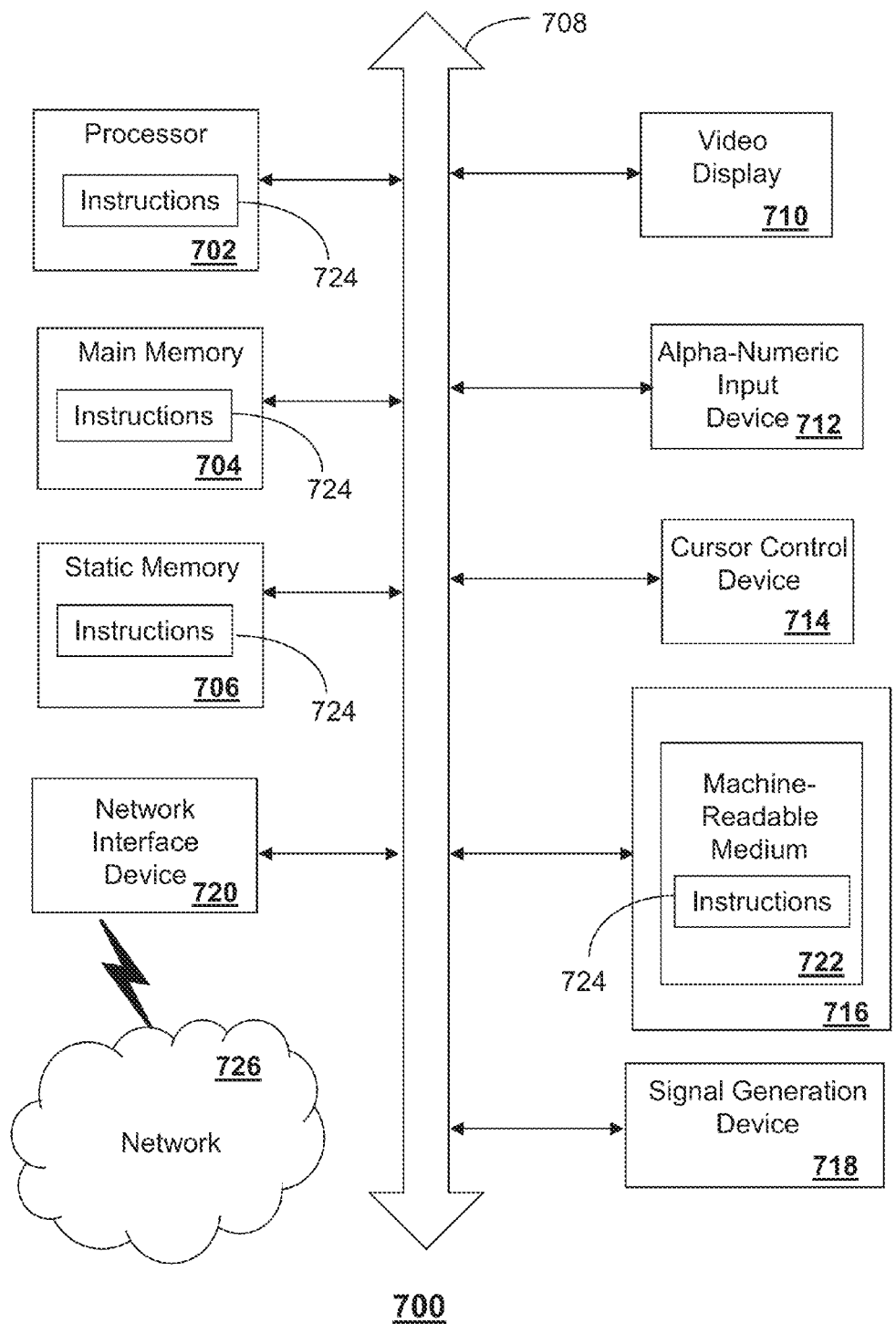
FIG. 7 is a diagrammatic representation of a machine in the form of a computer system within which a set of instructions, when executed, may cause the machine to perform any one or more of the methods discussed herein.

FIG. 7 depicts an exemplary diagrammatic representation of a machine in the form of a computer system 700 within which a set of instructions, when executed, may cause the machine to perform any one or more of the methods discussed above. One or more instances of the machine can operate, for example, as the communication device 104, the cellular base station 120, the broadcast stations 120 or combinations thereof. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   first and second mobile television receivers;
   a cellular transceiver;
   a memory that stores instructions; and
   a processor coupled to the first and second mobile television receivers, the cellular transceiver, and the memory, wherein responsive to executing the instructions, the processor performs operations comprising:
      receiving from the first mobile television receiver a first wireless digital television signal comprising a first plurality of data segments for presenting a television program;
      receiving from the second mobile television receiver a second wireless digital television signal comprising a second plurality of data segments for presenting a copy of the television program;
      detecting a transition from one of the first wireless digital television signal and the second wireless digital television signal, wherein responsive to the detecting of the transition, a next wireless digital television signal is determined to replace the one of the first wireless digital television signal and the second wireless digital television signal;
      buffering, via the memory, the first and the second plurality of data segments to generate a first and a second buffered plurality of data segments to cause a presentation delay of the television program;
      periodically selecting data segments from one of the first or the second buffered plurality of data segments as periodically selected data segments;
      presenting the television program according to the periodically selected data segments;
      upon detecting a missing data segment in the first and the second buffered plurality of data segments, the processor is operable to: transmit via the cellular transceiver a request to a network element to provide the missing data segment, and receive via the cellular transceiver the missing data segment prior to an expiration of the presentation delay to continue the presentation of the television program without interruption; and receiving from the network element information relating to a location of each of a plurality of terrestrial base stations transmitting wireless digital television signals, wherein the detecting the transition further comprises utilizing a look-up table to determine the next wireless digital television signal based on a location of the first and second mobile television receiver.

2. The device of claim 1, wherein the cellular transceiver operates according to a fourth generation cellular communications protocol, and wherein the processor is operable to cause the cellular transceiver to transmit and receive signals to and from the network element in conformance with the fourth generation cellular communications protocol.

3. The device of claim 1, wherein the cellular transceiver operates according to a third generation cellular communications protocol, and wherein the processor is operable to cause the cellular transceiver to transmit and receive signals to and from the network element in conformance with the third generation cellular communications protocol.

4. The device of claim 1, wherein the cellular transceiver operates according to a short range wireless communication protocol, and wherein the processor is operable to cause the cellular transceiver to transmit and receive signals to and from the network element in conformance with the short range wireless communication protocol.

5. The device of claim 4, wherein the short range wireless communication protocol comprises a wireless fidelity communications protocol.

6. The device of claim 1, wherein a first of the plurality of terrestrial base stations broadcasts the first wireless digital television signal, and wherein a second of the plurality of terrestrial base stations broadcasts the second wireless digital television signal.

7. The device of claim 1, wherein the device further comprises a location receiver coupled to the processor.

8. The device of claim 1, wherein the operations further comprise:

detecting from movement of the device a location or trajectory of the device, wherein the detecting the transition is based on the detecting the movement.

9. The device of claim 1, wherein the operations further comprise receiving a television program guide according to a location of the device.

10. A wireless base station, comprising:

first and second receivers;
a cellular transceiver;
a memory that stores instructions; and
a processor coupled to the first and second receivers, the cellular transceiver, and the memory, wherein responsive to executing the instructions, the processor performs operations comprising:

receiving from the first receiver a first wireless digital signal comprising a first plurality of data segments for presenting a media program;

receiving from the second receiver a second wireless digital signal comprising a second plurality of data segments for presenting a copy of the media program;

detecting a transition from one of the first wireless digital signal and the second wireless digital signal, wherein responsive to the detecting the transition, a next wireless digital signal is determined to replace the one of the first wireless digital signal and the second wireless digital signal;

buffering via the memory the first and the second plurality of data segments to generate first and second buffered plurality of data segments to cause a delay of the media program;

receiving a request from a mobile device for a missing data segment;

detecting a copy of the missing data segment in one of the first or the second buffered plurality of data segments;

transmitting the copy of the missing data segment to the mobile device prior to an expiration of the delay to continue a presentation of the media program at the mobile device without interruption;

transmitting to the mobile device information relating to a location of each of a plurality of terrestrial base stations transmitting wireless digital signals; and receiving a request from the mobile device for information about a terrestrial base station that the mobile device can transition to for supplying the next wireless digital signal according to a location or trajectory of the mobile device.

11. The wireless base station of claim 10, wherein the cellular transceiver operates according to a fourth generation cellular communications protocol, and wherein the processor is operable to cause the cellular transceiver to transmit and receive signals to and from the mobile device in conformance with the fourth generation cellular communications protocol.

12. The wireless base station of claim 10, wherein the cellular transceiver operates according to a third generation cellular communications protocol, and wherein the processor is operable to cause the cellular transceiver to transmit and receive signals to and from the mobile device in conformance with the third generation cellular communications protocol.

13. The wireless base station of claim 10, wherein the cellular transceiver operates according to a short range wireless communication protocol, and wherein the processor is operable to cause the cellular transceiver to transmit and receive signals to and from the mobile device in conformance with the short range wireless communication protocol.

14. The wireless base station of claim 13, wherein the short range wireless communication protocol comprises a wireless fidelity communications protocol.

15. The wireless base station of claim 10, further comprising a location receiver coupled to the processor.

16. The wireless base station of claim 10, wherein the operations further comprise transmitting to the mobile device a media program guide according to the location or trajectory of the mobile device.

17. A method, comprising:

receiving, by a system comprising a processor, first and second wireless signals through a respective one of first and second antennas, wherein the first wireless signal comprises a digital television signal comprising a first plurality of data segments for presenting a media content, and wherein the second wireless signal comprises a second wireless digital television signal comprising a second plurality of data segments for presenting a copy of the media content;

detecting, by the system, a transition from one of the first wireless signal and the second wireless signal, wherein responsive to the detecting the transition, a next wireless signal is determined to replace the one of the first wireless signal and the second wireless signal;

buffering, by the system, the plurality of data segments of each of the first and second wireless signals to generate first and second buffered plurality of data segments to cause a presentation delay of the media content;

selecting, by the system, data segments from the first and second buffered plurality of data segments as selected data segments, wherein the selecting is performed periodically;

presenting, by the system, the media content from the selected data segments;

detecting, by the system, a missing data segment in the first and second buffered data segments during the presenting of the media content;

transmitting, by the system, responsive to detecting the missing segment, a first request to a cellular communication system to provide the missing data segment during the presenting of the media content;

receiving, by the system, responsive to detecting the missing segment, from the cellular communication system the missing data segment prior to an expiration of the presentation delay to continue the presenting of the media content without interruption; and receiving, by the system, from the cellular communication system additional missing data segments responsive to transitioning between wireless terrestrial base stations, wherein the media content comprises one of still image content, moving image content, audio content, or combinations thereof.

18. The method of claim 17, wherein the cellular communication system operates according to one of a third generation cellular communications protocol, a fourth generation cellular communications protocol, or a wireless fidelity communications protocol.

19. The method of claim 17, further comprising receiving additional missing data segments after the expiration of the presentation delay.

20. The method of claim 19, further comprising presenting an interim content during an interruption period for presenting the media content.

* * * * *